United States Patent
Sauermann et al.

[11] Patent Number: 6,080,081
[45] Date of Patent: Jun. 27, 2000

[54] AUTOMATIC MOTOR VEHICLE P.T.O. DRIVE CONTROL

[75] Inventors: Gerd Sauermann, Markdorf; Klaus Hensinger, Friedrichshafen, both of Germany

[73] Assignee: ZF Friedrichshafen AG, Friedrichshafen, Germany

[21] Appl. No.: 09/341,344

[22] PCT Filed: Feb. 27, 1998

[86] PCT No.: PCT/EP98/01110

§ 371 Date: Jul. 8, 1999

§ 102(e) Date: Jul. 8, 1999

[87] PCT Pub. No.: WO98/39172

PCT Pub. Date: Sep. 11, 1998

[30] Foreign Application Priority Data

Mar. 5, 1997 [DE] Germany ............................ 197 08 929

[51] Int. Cl.[7] .................................................. B60K 17/28
[52] U.S. Cl. .......................... 477/79; 477/80; 74/15.86; 180/53.1
[58] Field of Search ................................ 74/15.84–15.86, 74/11; 477/79, 62, 80; 180/53.1–53.4

[56] References Cited

U.S. PATENT DOCUMENTS

| | | | |
|---|---|---|---|
| 4,670,902 | 6/1987 | Bellanger | 192/103 F |
| 5,437,355 | 8/1995 | Takagi et al. | 192/18 A |
| 5,522,778 | 6/1996 | Iwase et al. | 477/62 |
| 5,549,185 | 8/1996 | Kale | 192/103 F X |
| 5,562,173 | 10/1996 | Olson | 180/53.4 X |
| 5,593,363 | 1/1997 | Asai et al. | 477/74 |
| 5,611,751 | 3/1997 | Ehrenhardt | 74/11 X |
| 5,860,499 | 1/1999 | Onimaru et al. | 74/15.86 X |
| 5,971,888 | 10/1999 | Goode | 74/11 X |

FOREIGN PATENT DOCUMENTS

| | | |
|---|---|---|
| 0 569 726 A1 | 11/1993 | European Pat. Off. . |
| 0 677 415 A2 | 10/1995 | European Pat. Off. . |
| 19 30 046 | 6/1969 | Germany . |
| 2 246 908 | 9/1972 | Germany . |

*Primary Examiner*—Khoi Q. Ta
*Attorney, Agent, or Firm*—Davis and Bujold

[57] ABSTRACT

The invention related to a method for engaging power take-offs (28) in automated or partially automated transmissions (6) of commercial vehicles. A signal from the driver corresponding to a wish to engage the power take-off (28) is converted in a control device (34) into a signal for opening an automated clutch (4) between a prime mover (2) and the transmission (6) of the commercial vehicle. Once a predetermined minimum number of revolutions of the input shaft (10) of the transmission (6) is reached, a shifting device (26) is controlled for connecting the power take-off (28) with one transmission shaft (16, 42) that drives the power take-off (28) in order to obtain a closing of said shifting device (26, 52). The clutch (4) is again closed to prevent the teeth (50, 53) of the shifting device (26, 52) from remaining in front of each other. Sensors (32, 36, 40) determine whether the shifting device (26, 52) of the power take-off (28) has fully shifted, whether there is in the power take-off (28) a difference in the number of revolutions between the driving transmission shaft (16, 42) and the driven shaft (30, 72), or whether in the clutch (4) a defined adjustment travel has been exceeded.

7 Claims, 2 Drawing Sheets

AUTOMATIC MOTOR VEHICLE P.T.O. DRIVE CONTROL

FIELD OF THE INVENTION

The invention relates to a control of power take-offs in transmissions having available an automated or partially automated shifting device.

BACKGROUND OF THE INVENTION

In modern commercial vehicles shifting devices are being offered for partial automatic shifting of multi-step, especially multi-step change speed gears of motor vehicles having a clutch situated between the prime mover and the transmission and an electronic control unit for determining admissible shifting recommendations.

For the driver's assistance and to improve the economy when driving with commercial vehicles, especially those equipped with multi-ratio transmissions, several partially automatic shifting devices have been proposed and also developed for dealing with different problems and strategies.

Multi-step transmissions of that kind have as a rule a plurality of power take-off possibilities. Said power take-offs are not only synchronized but claw-clutch engaged. To engage the power take-off, there must be no great difference in the number of revolutions of the claw, since otherwise an undesirable grating noise appears. On the other hand, in case of a difference in the number of revolutions of almost zero, there is great probability of a tooth-on-tooth position of the claws resulting in the power take-off being unable to mesh.

SUMMARY OF THE INVENTION

The problem on which the invention is based is to develop further an automated or partially automated transmission having an automated clutch so as to obtain a reliable engagement of the claws.

In order to make possible in an automated transmission of a commercial vehicle the engagement of a power take-off, it is proposed according to the invention that the driver delivers his wish to switch on the power take-off in the form of a signal, for example, via a switch or push-button. The signal is converted in a control device to a signal for opening an automatic separating clutch between the prime mover and the transmission of the commercial vehicle. The number of revolutions of the input shaft is monitored by means of sensors. After reaching a predetermined minimum number of revolutions of the input shaft of the transmission, a shifting device is controlled for connecting the power take-off with a transmission shaft in order to close said shifting device. In the transmission this is the transmission shaft which is provided for driving the power take-off. Depending on the type of transmission these can be different transmission shafts. Here it is preferably a countershaft provided parallel to a main shaft disposed coaxially relative to the input shaft of the transmission. In a transmission having two countershafts disposed in parallel, to one of the two countershafts the power take-off is preferably attached for distribution of load to said two countershafts. The clutch is then closed again. Hereby a torsional torque is again applied to the driving transmission shaft whereby the teeth of the opposite structural parts of the shifting device can revolve relative to each other to avoid or eliminate the possibility of the teeth remaining in front of each other.

Another advantageous development has sensors which ensure that the power take-off will be switched on only when the conditions have been fulfilled that the prime mover of the vehicle works, that the vehicle is stopped, that the transmission is in a neutral position and that no shifting of the transmission is active or has been initiated.

In another advantageous development reaching the minimum number of revolutions is accelerated by a braking device in the transmission. It is possible, for example, to place on the countershafts or one of the countershafts an inertia brake in the form of a multi-disc brake. Braking devices are also possible on the input shaft.

One other advantageous development has one sensor on the shifting device with which it is determined whether a difference in the number of revolutions exists between the transmission's shaft and the shaft connected with the power take-off or whether a defined clutch adjustment travel has been exceeded.

BRIEF DESCRIPTION OF THE DRAWING(S)

The invention is further explained with reference to drawings wherein.

DESCRIPTION OF THE PREFERRED EMBODIMENT(S)

Figure 1:
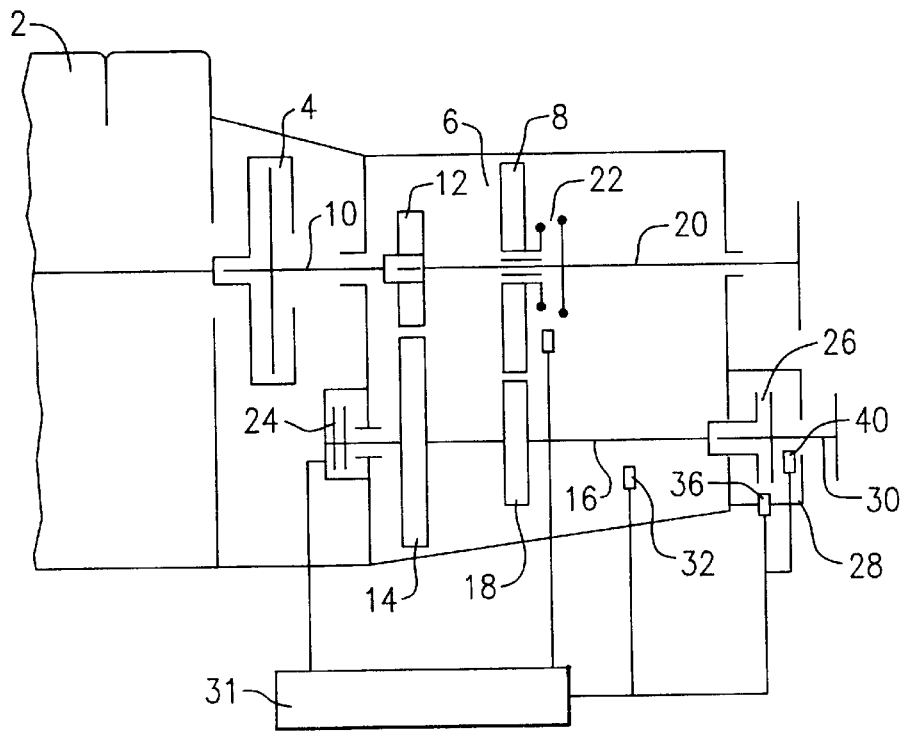
FIG. 1 is a diagrammatic representation of a transmission with power take-off.

FIG. 1 diagrammatically shows a prime mover 2 which is connected with a transmission 6 by a clutch 4. The input shaft 10 of the transmission 6 supports a gear 12 which meshes with a gear 14 on the countershaft 16. Of the multiple speed ratio steps of the transmission here is only shown one speed ratio step, the one that has the gear 18 on the countershaft 16 and the gear 8 on the main shaft 20 of the transmission. The main shaft 20 is coaxially relative to the input shaft 10. The gear 8 can be connected via a shifting device 22 with the main shaft 20 for torque transmission. In addition, a transmission brake 24 is situated on the countershaft 16, with which the countershaft 16 can be decelerated. The countershaft 16 can be connected by a shifting device 26 in a power take-off 28 with a shaft 30 by which can be driven a device such as a pump not shown here.

On the countershaft 16 is placed a sensor 32 with which the number of revolutions on the countershaft can be detected and communicated to a control device 34. One other sensor 36 in the power take-off 28 establishes the position of the shifting device 26 and relays the signal concerning the position, for example, via a CAN-Bus 38 to which is also attached the sensor 32, to the control device 34. Another sensor 40 in power take-off 28 detects the number of revolutions of the shaft 30 and relays this information like-wise via the CAN-Bus to the control device 34. The control device 34 is connected via the CAN-Bus 38 at least with the braking device 24, the shifting device 12 and the shifting device 26.

Figure 2:
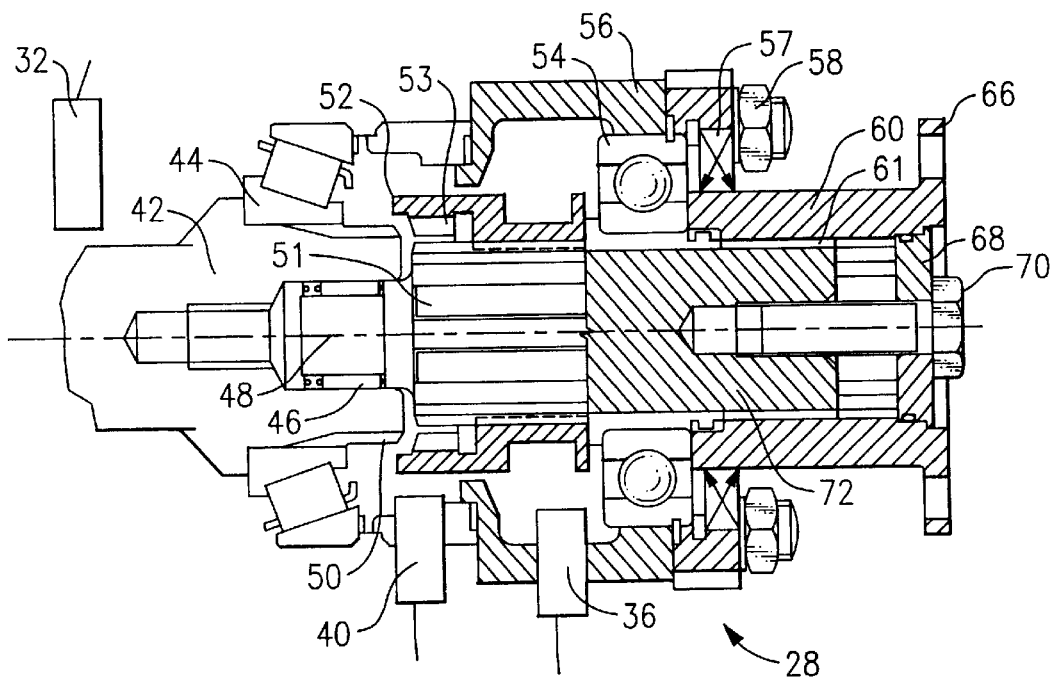
FIG. 2 is a shifting device of a power take-off.

FIG. 2 shows a shifting device 26 for a power take-off 28.

The torque on the power take-off 28 is introduced by the shaft 42 which is within the housing of the transmission 6. Structural parts to be driven, not shown, are fastened on the flange 66 of the power take-off 28.

Upon the serration 51 of the intermediate shaft 72 is axially movably situated the sliding sleeve 52. The serration 53 of the sliding sleeve 52 can be brought to mesh with the serration 50 of the shaft 42 by an actuation component not shown here. Said device makes it possible to engage or disengage the power take-off 28. In the disengaged state shown the intermediate shaft 72 can revolve relative to the shaft 42. The pivot 48 is supported in the cylinder roller bearings 46. A second bearing point of the intermediate shaft 72 is the ball bearing 54 which is fixed in the intermediate housing 56 by means of bolts 58. The shaft seal ring 57 outwardly seals the transmission housing.

The structural part 60 has a serration 61 by which it is torque positive connected with the intermediate shaft 72 which in this area also has a serration. The structural part 60 is axially retained on the intermediate shaft 72 by the lid 68 which is fastened with the bolt 70 in the intermediate shaft 72.

Figure 3:
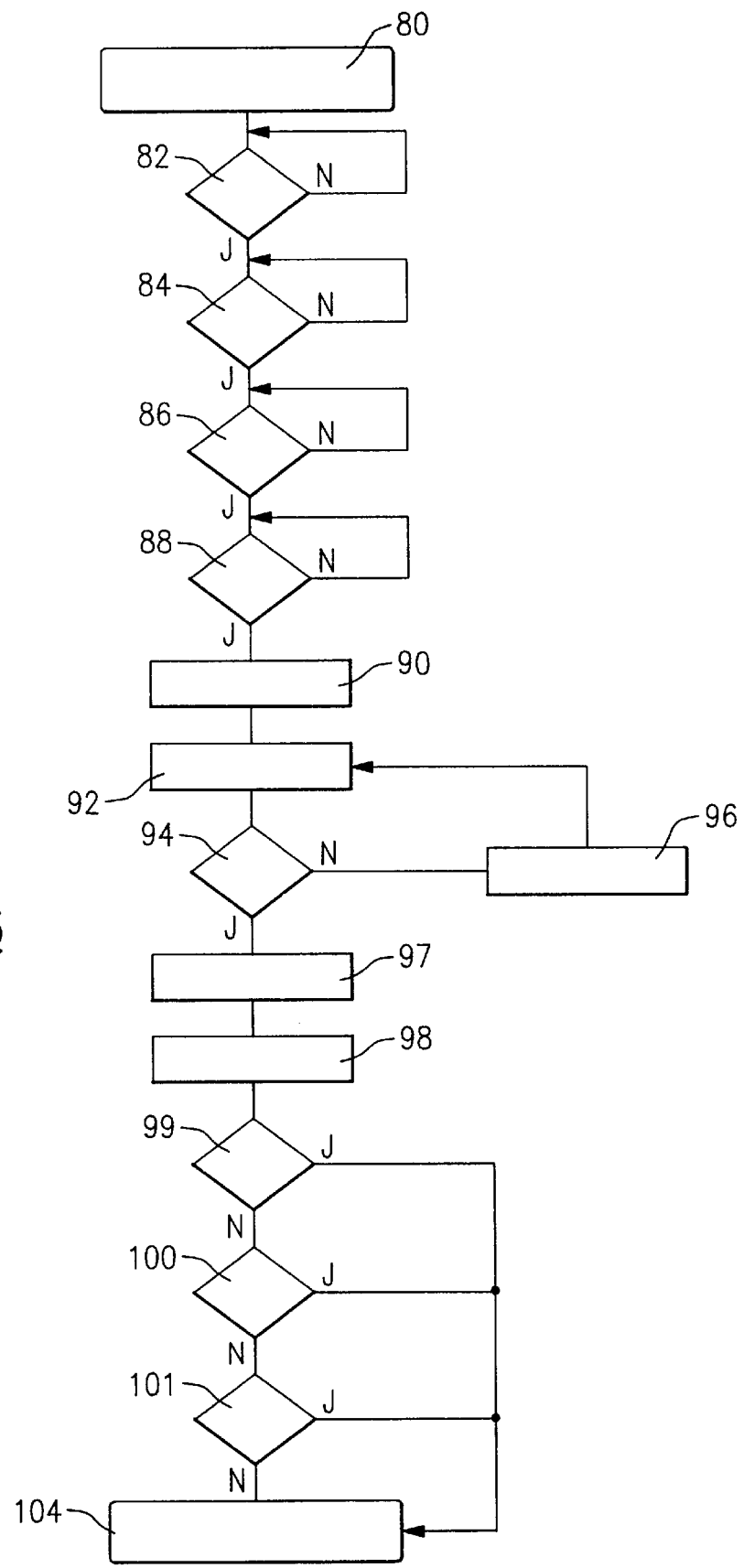
FIG. 3 is the operation sequence of the method.

FIG. 3 shows an operation sequence of the method for control of the power take-off 28.

The method for engaging the power take-off beings in a start block 80. In a series of "if" inquires is tested whether the requirements for shifting a power take-off has been met. In a fist condition inquiry 82 is determined whether the vehicle engine runs. If this condition has been met, in a condition inquiry 84 that follows is tested whether the vehicle stands. If this condition has been met, in a condition inquiry 86 that follows is determined whether the transmission 6 has been shifted to neutral. If this condition also has been met, in a condition inquiry 88 in tested whether a shift is active, that is, whether, at that time, the shifting devices 22 of the transmission 6 have not been actuated.

In the absence of one of the tested conditions, the operation sequence goes back to a point respectively before the unfulfilled condition.

If all conditions have been met, a power take-off requirement symbolized by the function block 90 is registered and accepted by the driver and leads to an opening of the clutch 2 shown by the function block 92. In condition inquiry 94 it is determined whether the number of revolutions of the input shaft 10 of the transmission 6 is below a preset threshold value. If this condition has not been met, in function block 96 a signal is produced for reducing the input shaft number of revolutions, preferably by means of a transmission brake 24 on the input shaft 10 or the countershaft 16, or also by allowing a time interval to elapse. If in the condition inquiry 94 it is determined that the input shaft number of revolutions is below the preset threshold valve, then the function block 97 causes the power take-off 28 to be shifted by actuating the shifting device 26. The function block 98 simultaneously causes the clutch 4 to start closing. Condition inquiry 99 determines whether the shifting device 26 of the power take-off 28 has completely shifted. In the absence of said condition, it is determined in the condition inquiry 100 whether a difference in the number of revolutions exists in the power take-off between the driving shaft 42 and the output flange 66 of the power take-off 28. If this condition also has not been met, in one other condition inquiry 102 it is determined whether a defined preset engagement travel of the clutch has been exceeded. The condition inquiries 99, 100, 102 are here shown consecutively. But also only one condition is enough to determine whether the power take-off 28 has been shifted.

As soon as one of the conditions determined in the inquiries 99, 100, 102 has been met, the engagement of the clutch 4 is interrupted and the clutch is again opened.

The termination of the method is symbolically shown in the function block 104 which indicates that the power take-off 28 has shifted.

| Reference numerals | |
|---|---|
| 2 prime mover | 32 sensor |
| 4 clutch | 34 control device |
| 6 transmission | 36 sensor |
| 8 gear | 38 CAN-Bus |
| 10 input shaft | 40 sensor |
| 12 gear | 42 shaft |
| 14 gear | 46 cylinder roller bearing |

-continued

| Reference numerals | |
|---|---|
| 16 countershaft | 48 pivot |
| 18 gear | 50 serration |
| 20 main shaft | 51 serration |
| 22 shafting device | 52 sliding sleeve |
| 24 transmission brake | 53 serration |
| 26 shifting device | 54 ball bearing |
| 28 power take-off | 56 intermediate housing |
| 30 shaft | 57 shaft seal ring |
| 58 bolt | 72 intermediate shaft |
| 60 part with the set braking point | 80 start block |
| 61 serration | 82–88 condition inquiry |
| 62 groove | 90 function block |
| 64 serrated groove | 92 function block |
| 66 flange | 94 condition inquiry |
| 68 lid with the function loss-proof | 96–98 function block |
| 70 bolt | 99–102 condition inquiry |
| 71 recess | 104 function block |

What is claimed is:

1. A method for engaging power take-offs (28) in commercial vehicles, comprising the steps of:

delivering a signal to engage said power take-off (28);

converting said signal to engage, in a control device (34), into a signal for opening an automated clutch (4) between a prime mover (2) and said transmission (6) of the commercial vehicle;

reaching a predetermined minimum number of revolutions of the input shaft (10) of said transmission (6);

controlling a shifting device (26) for connecting said power take-off (28) with a transmission shaft (16, 42) which drives said power take-off;

closing said shifting device (26, 52); and closing said clutch (4).

2. The method for engaging power take-offs (28) according to claim 1, further comprising the step of:

reaching the minimum number of revolutions in said transmission (6) rapidly by using a braking device (24).

3. The method for engaging power take-offs (28) according to claim 1, further comprising the step of:

determining by sensors (36) whether said shifting device (26, 52) of said power take-off (28) has completely shifted.

4. The method for engaging power take-offs (28) according to claim 1, further comprising the step of:

determining by sensors (33, 4) whether there exists in said power take-off (28) a difference in the number of revolutions between a driving transmission shaft (16, 42) and a driven shaft (30, 72).

5. The method for engaging power take-offs (28) according to claim 1, further comprising the step of:

determining whether a defined clutch adjustment travel has been exceeded in said clutch (4).

6. The method for engaging power take-offs (28) according to claim 1, further comprising the step of:

shifting said shifting device when the following conditions have been met:
    said prime mover (2) of the vehicle is operating,
    the vehicle is stopped,
    the transmission (6) is in a neutral position,
    no shifting of said transmission (6) is active, and;
    no shifting of said transmission has been initiated.

7. The method for engaging power take-offs (28) according to claim 1, wherein said transmission has two countershafts (16), further comprising the step of:

driving said power take-off (28) by one of said two countershafts (16).

* * * * *